United States Patent
Schäfer et al.

(10) Patent No.: US 6,458,918 B1
(45) Date of Patent: Oct. 1, 2002

(54) METHOD FOR PRODUCING PARTIALLY CRYSTALLINE POLYETHER POLYOLS

(75) Inventors: Walter Schäfer, Leichlingen; Jörg Hofmann, Krefeld; Pramod Gupta, Bedburg; Hanns-Peter Müller, Odenthal; Harald Pielartzik, Krefeld, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/530,304

(22) PCT Filed: Oct. 21, 1998

(86) PCT No.: PCT/EP98/06689
§ 371 (c)(1),
(2), (4) Date: Apr. 27, 2000

(87) PCT Pub. No.: WO99/23135
PCT Pub. Date: May 14, 1999

(30) Foreign Application Priority Data

Nov. 3, 1997 (DE) .......................................... 197 48 359

(51) Int. Cl.$^7$ ............................................... C08G 65/12
(52) U.S. Cl. ........................ 528/415; 502/154; 502/156; 568/700; 568/606; 528/403; 528/405; 528/410; 528/412; 528/414; 528/416; 528/411; 528/85
(58) Field of Search ................................. 502/154, 156; 568/700, 606; 528/403, 410, 405, 412, 414, 416, 411, 415, 85

(56) References Cited

U.S. PATENT DOCUMENTS 3,432,445 A * 3/1969 Osgan et al.

OTHER PUBLICATIONS

Journal of Polymer Science, (Polymer Chemistry Edition) vol. 15, (month unavailable) 1977, pp. 1655–1666, Shibatani et al, Polyurethanes. IV, Effect of Poly(propylene Glycol) Tacticity on the Properties of Block Copolyether–Urethanes.

Polymer Preprints, (month unavailable) 1984, p. 218–219, Ph. Teyssié et al, Metal–Alcoholate Initiators: Source of Answers and Questions in Ring–Opening Polymerization of Heterocyclic Monomers.

Journal of Polymer Science: Part A Polymer Chemistry, vol. 24, (month unavailable) 1986, pp. 1423–1431, E. J. Vandenberg, Some Aspects of the Bimetallic $\mu$–Oxo–alkoxides for Polymerizing Epoxides to Polyether Elastomers.

* cited by examiner

Primary Examiner—Robert Dawson
Assistant Examiner—Kuo-Liang Peng
(74) Attorney, Agent, or Firm—Joseph C. Gil; N. Denise Brown

(57) ABSTRACT

The present invention relates to a process for the preparation of novel, partially crystalline polyether polyols with a functionality of $\geq 2$, an average molecular weight $M_n$ of 500 to 100,000 and a molar proportion of isotactic triads determining the crystallinity of >28%. The new polyether polyols are prepared by polymerizing alkylene oxides in the presence of a bimetallic :-oxoalkoxide modified with hydroxyl compounds.

5 Claims, No Drawings

METHOD FOR PRODUCING PARTIALLY CRYSTALLINE POLYETHER POLYOLS

BACKGROUND OF THE INVENTION

The invention relates to a process for the preparation of novel, partially crystalline polyether polyols having a hydroxy functionality of $\geq 2$ and to the new polyether polyols and the use thereof.

It is known from the literature that products with improved mechanical properties may be synthesised with crystallising polyether polyols based on propylene oxide having a functionality of 2 according to the isocyanate-polyaddition process (J. of Polymer Sci. (Polym. Chem. Ed.) Vol. 15, 1655ff (1977)). The preparation of crystalline hydroxyfunctional dihydroxy polyethers from isotactic polypropylene glycols by ozonolysis followed by hydrogenation with moisture-sensitive and oxygen-sensitive reagents and fractionation is extremely laborious and permits little variability. The object was, therefore, to provide a broad range of crystalline hydroxy polyethers having a functionality of $\geq 2$ which are suitable, e.g. for PUR synthesis, according to a less laborious process with a large potential for variation.

It is also known that bimetallic $\mu$-oxoalkoxides are suitable for the polymerisation of propylene oxide to crystallising polyether polyols U.S. Pat. No. 3,432,445, Polym. Preprints 218 (1984)). No references to the preparation of polyether polyols having a suitable hydroxy functionality which are suitable as chain extenders and crosslinking agents for isocyanate polyaddition can be derived from the publication.

These bimetallic catalysts used for propylene oxide polymerisation contain monool substituents which are then incorporated in the polypropylene oxide during the polymerisation process, which leads to polypropylene oxides having a hydroxy functionality well below 2, which are unsuitable e.g. as chain extenders for the preparation of polyurethanes.

Surprisingly, it has now been found that, as a result of reacting bimetallic catalysts with hydroxyl compounds having a functionality of $\geq 2$, catalysts are produced which permit the polymerisation of alkylene oxide to polyether polyols having a functionality of $\geq 2$. The surprising aspect hereof is that the catalytically active bimetallic starting compounds which, according to the literature (J. of Polym. Sci.: Part A: Polym. Chem., 24, 1423 (1986)), are sensitive to impurities, are still active for alkylene oxide polymerisation after the reaction with hydroxyl compounds, even at temperatures of 100–160° C.

Moreover, it could not have been foreseen that the bimetallic catalysts, which are to be regarded as polyfunctional with respect to hydroxyl compounds, do not crosslink or interconnect in the presence of hydroxyl compounds having a functionality of $\geq 2$, and remain catalytically active.

SUMMARY OF THE INVENTION

The invention relates, therefore, to a process for the preparation of novel, partially crystalline polyether polyols having a hydroxy functionality of >2, which is characterised in that alkylene oxides are polymerised in the presence of bimetallic $\mu$-oxoalkoxides corresponding to the formula (I)

$$(RO)_{x-1}-M_2-O-M_1-O-M_2-(OR)_{x-1} \qquad (I)$$

wherein
R stands for a $C_1$–$C_{10}$ alkyl radical, $M_1$ stands for zinc, cobalt, molybdenum, iron, chromium or manganese,
$M_2$ means aluminium or titanium and
x stands for 3 to 4,
wherein the $\mu$-oxoalkoxides (I) were reacted beforehand with hydroxyl compounds corresponding to the formula (II)

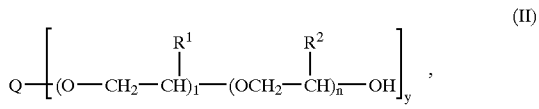

in which
Q stands for a $C_2$–$C_{20}$ alkyl group,
$R^1$ and $R^2$, independently of one another, mean hydrogen or $C_1$–$C_{20}$ hydrocarbon radicals,
1 and n independently of one another, stand for numbers from 0 to 40, and
y means an integer from 2 to 6.

Suitable bimetallic $\mu$-oxoalkoxides are preferably those in which $M_1$ stands for zinc and $M_2$ stands for aluminium, x is the number 3 and R stands for n- and isopropyl and also n-butyl.

The bimetallic $\mu$-oxoalkoxides suitable for use in the process according to the invention are well known and described in more detail, for example, in the U.S. Pat. No. 3,432,445 mentioned above.

Particularly suitable hydroxyl compounds corresponding to formula (II) which are reacted with the bimetallic $\mu$-oxoalkoxides used are those with a functionality of $\geq 2$, preferably 2 to 6, which have an average molecular weight of 90 to 6000, preferably 90 to 2000. The average molecular weight is determined in the usual way by measuring the OH value or by GPC against polystyrene as a comparison.

Hydroxyl compounds corresponding to formula (II) include, in particular, polypropylene glycols, polyethylene glycols, polyethylene oxide polypropylene oxide block copolymers and random C—O—PO-copolymers, in addition to the well known low molecular weight polyhydroxyl compounds. Such compounds are described e.g. in Kirk-Othmer (3)1, 754 to 789.

More particularly preferred hydroxyl compounds include:
Butane-1,4-diol, diethylene glycol, dipropylene glycol, tripropylene glycol, and polypropylene glycols having an $M_n$ of 200 to 2000 started on propylene glycol, butane-1,4-diol, glycerol, triethylol propane or sorbitol, or copolymers of propylene oxide and ethylene oxide started on ethylene glycol, propylene glycol, butane-1,4-diol, glycerol or trimethylol propane having an $M_n$ of 220 to 2000.

The reaction of the bimetallic $\mu$-oxoalkoxide used corresponding to formula (I) with a hydroxyl compound corresponding to formula (II) takes place in such a way that 1 mole of polyol (II) is mixed with $5.10^{-4}$ to 0.6, preferably $1.10^{-3}$ to 0.3 mole of $\mu$-oxoalkoxide and the mixture is heated for about 0.5 to 10 hours, preferably 2 to 5 hours, at about 100 to 150° C., preferably 110 to 130° C.

The reaction mixture is then stirred for a certain period (about 0.5 to 5 hours), optionally at a pressure below atmospheric, at elevated temperature (about 100 to 150° C.).

The reaction mixture is then diluted with an organic solvent and/or diluent, e.g. a suitable hydrocarbon such as xylene and/or ligroin, preferably to 80 to 50 wt. %, and the solvent and/or diluent is then distilled again at reduced pressure (about 0.01 to 1013 mbar).

The bimetallic $\mu$-oxoalkoxide thus modified with the polyols is then reacted with suitable alkylene oxides for the preparation of the partially crystalline polyether polyols. The reaction is carried out preferably at 20 to 200° C., particularly at 80 to 150° C., under normal or elevated pressure up to 20 bar.

Alkylene oxides suitable for such reactions are the well known alkylene oxides, preferably propylene oxide, 1,2-butylene oxide, epichlorohydrin, alkyl glycidyl ether and mixtures thereof. Propylene oxide and/or ethylene oxide is used in preference. Prior to the reaction with alkylene oxides, the modified $\mu$-oxoalkoxide may be diluted with hydroxyl compounds having a functionality of $\geq 2$, preferably with hydroxyl compounds corresponding to formula (II).

The reaction of the modified catalyst with the alkylene oxides may be carried out in bulk or in a suitable inert organic solvent such as toluene, xylene and/or tetrahydrofuran. The concentration and quantity of the solvent is chosen such that good control of the conversion reaction is possible under the given reaction conditions.

The modified bimetallic $\mu$-oxoalkoxide is generally used in quantities of $5.10^{-2}$ to 60 mole %, preferably in quantities of 0.1 to 20 mole %, based on the quantity of the polyether polyol to be prepared.

The new, partially crystalline polyether polyols with a functionality of $\geq 2$, preferably 2 to 6, prepared according to the process of the invention, have average molecular weights $M_n$ of 500 to 100,000, preferably 1000 to 10,000, determined by GPC against polystyrene or by means of the hydroxyl end group content (OH value), and have a molar proportion of isotactic triads determining the crystallinity of >28%, preferably >33%, determined by $^{13}$C-NMR spectroscopy.

The present invention also relates, therefore, to the new, partially crystalline polyether polyols of the kind described above.

The process according to the invention may be carried out both continuously and batchwise, for example, in a batch or semi-batch process.

According to the process of the invention, the crude product is worked up preferably by dissolving the polyether polyol prepared in a solvent such as toluene, xylene, tetrahydrofuran, ethyl acetate and/or methylene chloride.

The catalyst is then destroyed by acidified water and the reaction products are extracted with aqueous acid (<25 wt. %), preferably with water. Preferably 1 to 2 acid equivalents are used to destroy the catalyst. Suitable acids include, i.a., hydrochloric acid, phosphoric acid, sulfuric acid, benzoic acid, acetic acid and/or lactic acid. Of course, other acids may also be used.

After intensive shaking with aqueous acid, the excess acid is removed by washing with water, optionally in the presence of a compound giving an alkaline reaction such as sodium bicarbonate. The polyol solution obtained is separated from the water, dried and the solvent is removed.

The product may be further purified by fractional precipitation under cold conditions from suitable solvents such as, e.g., acetone.

The partially crystalline polyether polyols prepared according to the process of the invention are outstandingly suitable for the preparation of polyurethane materials such as PUR elastomers, PUR foams and PUR coatings. The preparation of the above-mentioned PUR materials is well known and described, for example, in Kunststoff Handbuch, volume 7, 3rd edition, Carl-Verlag Verlag, 1993.

EXAMPLES

Preparation of a Bimetallic $\mu$-Oxoalkoxide A Based on Zinc and Aluminium 9 g of zinc acetate and 20.4 g of aluminium isopropylate were heated to reflux in 500 ml of decalin and the isopropyl acetate forming was distilled over a column.

After no more isopropyl acetate was produced, the solvent was removed from the reaction solution and the residue was taken up in 200 ml of n-heptane. A 0.35 molar solution of di-$\mu$-oxo-[bis(1-methylethyloxy)-aluminium]-zinc was obtained.

Example 1 a. 1.3 g of the bimetallic $\mu$-oxoalkoxide A, dissolved in 10 ml of heptane, were added to 100 g of a polypropylene glycol with an OH value of 112 mg KOH/g and stirred for 3 hours at 130° C. under a pressure of 0.2 mbar.

10 ml of toluene were then added to the solution and the reaction mixture was stirred for a further 2 hours at 120–130° C. The toluene was then distilled off at a pressure substantially below atmospheric and the reaction mixture was heated again for 1 hour at 130° C.

b. The pre-activated polypropylene glycol was then transferred to an autoclave and reacted with 500 g of propylene oxide under a pressure of 3 bar and at a temperature of 130 to 140° C. The crude product is dissolved in toluene and 2n hydrochloric acid is added until a pH of <5 is obtained, and the mixture is then shaken with water. The product was then washed with an aqueous bicarbonate solution for neutralisation. The organic phase was separated and dried.

The partially crystalline, waxy product has an OH value of 20 mg KOHW/g and an $M_n$ of 5900 according to GPC. The crystalline phase in the polyether polyol melted at 55° C. The product contained a molar proportion of isotactic triads of 64%.

Example 2 a. 2.7 g of the bimetallic $\mu$-oxoalkoxide A, dissolved in 20 ml of heptane, were added to 10 g of a propylene glycol with an OH value of 515 mg KOH/g and stirred at 130° C. for 5 hours under a pressure of 0.2 mbar.

Another 40 g of the polyether with an OH value of 515 were then added and the reaction mixture was stirred for another 3 hours at 130° C. at a pressure below atmospheric.

b. The catalyst solution was transferred to an autoclave and reacted with 400 g of propylene oxide at a pressure of 3 bar and a temperature of 130 to 140° C .

The crude product was dissolved in methylene chloride and 20% phosphoric acid was added until a pH of <5 was obtained and the mixture was shaken with water. The product was washed with an aqueous bicarbonate solution for neutralisation. The organic phase was separated and dried.

The partially crystalline, waxy product had an OH value of 65 mg KOH/g and an $M_n$ of 1900 according to GPC.

Example 3 a. 5.5 g of the bimetallic $\mu$-oxoalkoxide A, dissolved in 40 ml of heptane, were added to 100 g of a hydroxypolyether, started on trimethylol propane, based on propylene oxide with an OH value of 380 mg KOH/g, and stirred at 130° C. for 5 hours under a pressure of 0.2 mbar.

10 ml of toluene were then added to the solution and the reaction mixture was stirred for a further 2 hours at 120–130° C. The toluene was then distilled off at a pressure substantially below atmospheric and the reaction mixture was heated again for 1 hour at 130° C.

The catalyst solution was then transferred to an autoclave and reacted with 1 kg of propylene oxide at a pressure of 3 bar at a temperature of 150° C.

The crude product was dissolved in methylene chloride and 2 n hydrochloric acid was added until a pH of <5 was obtained and the mixture was then shaken with water. The product was then washed with an aqueous bicarbonate solution for neutralisation. The organic phase was separated and dried.

The partially crystalline, waxy product has an OH value of 42 mg KOH/g and an $M_n$ of 4290 according to GPC.

Example 4

6.5 g of the bimetallic $\mu$-oxoalkoxide compound A dissolved in 50 g of n-heptane were added to 500 g of an ethylene oxide-propylene oxide polyether (50% ethylene oxide) with an OH value of 56 with 70 to 80% of primary OH groups and stirred at 130° C. for 3 hours under a pressure of 0.2 mbar.

50 ml of toluene were then added to the solution and the reaction mixture was stirred for a further 2 hours at 120 to 130° C. The toluene was then distilled off at a pressure substantially below atmospheric and the reaction mixture was heated again for 1 hour at 130° C.

The catalyst solution was then transferred to an autoclave and reacted with 1500 g of propylene oxide at a pressure of 3 bar at 130 to 140° C. The crude product is dissolved in toluene and 2n hydrochloric acid is added at pH <5 and the mixture is then shaken with water. The product was washed with an aqueous bicarbonate solution for neutralisation. The organic phase was separated and dried.

The partially crystalline, waxy product has an OH value of 14 and an $M_n$ of 7800 according to GPC.

Example 5

1.3 g of the bimetallic $\mu$-oxoalkoxide A dissolved in 10 ml of heptane were added to 100 g of a polypropylene glycol, started on sorbitol, with an OH value of 450 mg KOH/g and stirred at 130° C. for 3 hours under a pressure of 0.2 mbar.

10 ml of toluene were then added to the solution and the reaction mixture was stirred for a further 2 hours at 120 to 130° C. The toluene was then distilled off at a pressure substantially below atmospheric and the reaction mixture was heated again for 1 hour at 130° C.

The pre-activated polyol was then reacted with 250 g of propylene oxide in an autoclave under a pressure of 3 bar and at a temperature of 150° C. After the purification stage similar to Example 1b, the partially crystalline product has an OH value of 135 mg KOH/g and an $M_n$ of 2600 according to GPC.

Example 6

1000 g of a polypropylene glycol pre-activated in a similar way to Example 1a, with an OH value of 112 mg KOH/g, were reacted at 120 to 130° C. under normal pressure with 1000 g of propylene oxide. The crude product is dissolved in toluene, 150 ml of 2n hydrochloric acid are added and the mixture shaken with water. The product was washed with aqueous bicarbonate solution for neutralisation.

The organic phase was separated and dried. The partially crystalline product has an OH value of 57 mg KOH/g and an $M_n$ of 2000 according to GPC.

Example 7

50 ml of toluene were then added to 50 g of a polypropylene glycol pre-activated in a similar way to Example 1a, with an OH value of 112 mg KOH/g, and then reacted with 50 g of propylene oxide at 120° C. After the purification stage similar to Example 1b, the viscous product has an OH value of 57.5 mg KOH/g and an $M_n$ of 2000 according to GPC.

Example 8

500 g of xylene were added to 250 g of a polypropylene glycol pre-activated in a similar way to Example 1a, with an OH value of 112 mg KOH/g, and then reacted with 750 g of propylene oxide in an autoclave at a pressure of 3 bar and at a temperature of 150° C. After the purification stage similar to Example 1b, the product which solidifies at room temperature has an OH value of 32 mg KOH/g and an $M_n$ of 3700 according to GPC.

What is claimed is:

1. A process for the preparation of partially crystalline polyether polyols having a hydroxy functionality of $\geq 2$, comprising (1) polymerizing
      (a) an alkylene oxide, with
      (b) the reaction product of
         (i) one or more bimetallic $\mu$-oxoalkoxides corresponding to the formula (I):

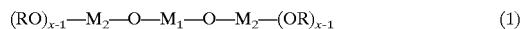

$$(RO)_{x-1}—M_2—O—M_1—O—M_2—(OR)_{x-1} \qquad (1)$$

wherein:
      each R: independently represents a $C_1$–$C_{10}$ alkyl radical;
      $M_1$: represents zinc, cobalt, molybdenum, iron, chromium, or manganese;
      each $M_2$: independently represents aluminum or titanium; and
      each x: independently represents 3 or 4; and
   (ii) one or more hydroxyl compounds corresponding to the formula (II):

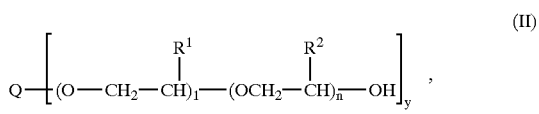

$$Q\!-\!\!\left[(O-CH_2-\overset{R^1}{\underset{|}{C}H})_l-(OCH_2-\overset{R^2}{\underset{|}{C}H})_n-OH\right]_y, \qquad (II)$$

wherein:
      Q: represents a $C_2$–$C_{20}$ alkyl group;
      $R^1$ and $R^2$: each independently represent a hydrogen atom, or a $C_1$–$C_{20}$ hydrocarbon radical;
      l and n: independently represent numbers of from 0 to 40; and
      y: represents an integer from 2 to 6.

2. A process according to claim 1, characterized in that bimetallic $\mu$-oxoalkoxides used are those in which $M_1$ stands for zinc and $M_2$ stands for aluminum, x is the number 3 and R stands for n-propyl, isopropyl, or n-butyl.

3. A process according to claim 1, characterised in that hydroxyl compounds corresponding to formula (II) used are those having a functionality of $\geq 2$ and an average molecular weight of 90 to 6000.

4. A process according to claim 1, characterised in that each 1 mole of the hydroxyl compound corresponding to formula (II) is mixed with $5.10^{-4}$ to 0.6 mole of bimetallic $\mu$-oxoalkoxide.

5. A process according to claim 1, characterised in that after the $\mu$-oxoalkoxides have been mixed with the hydroxyl compounds the mixture is heated for 0.5 to 10 hours at 100 to 150° C.

* * * * *